United States Patent

[11] 3,581,496

| [72] | Inventors | Reiner Eggebrecht<br>Munich-Karlsfeld;<br>Josef Hueller, Munich, both of, Germany |
| --- | --- | --- |
| [21] | Appl. No. | 831,553 |
| [22] | Filed | June 9, 1969 |
| [45] | Patented | June 1, 1971 |
| [73] | Assignee | M. A. N. Turbo G.m.b.H.<br>Munich-Allach, Germany |
| [32] | Priority | June 12, 1968 |
| [33] | | Austria |
| [31] | | A5629/68 |

[54] ROTATING REGENERATIVE HEAT-EXCHANGER
1 Claim, 6 Drawing Figs.

[52] U.S. Cl. .................................................. 60/39.51, 165/8

[51] Int. Cl. .................................................. F02c 7/10
[50] Field of Search .................................... 60/39.51 R; 165/7, 8, 9

[56] References Cited
UNITED STATES PATENTS

| 2,976,683 | 3/1961 | Flanigan et al. | 60/39.51R |
| --- | --- | --- | --- |
| 3,083,762 | 4/1963 | Kolthoff et al. | 165/8 |
| 3,491,537 | 1/1970 | Stopa | 60/39.51R |

*Primary Examiner*—Douglas Hart
*Attorney*—Craig, Antonelli, Stewart & Hill

ABSTRACT: A rotating regenerative heat exchanger for use with a gas turbine engine, whose axis of rotation is inclined to the center longitudinal axis of the gas turbine engine.

INVENTORS
REINER EGGEBRECHT
JOSEPH HÜLLER

INVENTORS
REINER EGGEBRECHT
JOSEPH HÜLLER

BY Craig, Antonelli, Stewart & Hill
ATTORNEYS

ROTATING REGENERATIVE HEAT-EXCHANGER

The present invention relates to a rotating regenerative heat exchanger which repeats the compressor air to be supplied to the combustion chamber of the gas turbine engine or propulsion unit by means of a portion of the heat contained in the exhaust gases of the gas turbine engine. Such heat exchangers are used in gas turbine engines or drive units in order to improve their thermal efficiency. In particular, such heat exchangers are employed in order to reduce the relatively high fuel consumption encountered, for example, with gas turbine engines or drive units for vehicles, such as, motor vehicles.

With heat exchangers of the aforementioned type, a maximum degree of heat exchange (ratio of air temperature rise to difference in intake temperatures of the two heat-exchanging media) is aimed at, which will lead to an improvement of the thermal efficiency of the gas turbine engine.

It is a known fact that the thermal efficiency and thus the specific performance of a gas turbine engine are impaired by gas and air pressure losses as well as by leakages due to the rotation of the matrix elements of the heat exchanger.

With regenerative heat exchangers, a high degree of heat exchange can be achieved by using relatively large heat transition surfaces. However, this measure leads to relatively large dimensions of such heat exchangers so that the coordination thereof to a gas turbine engine causes difficulties, especially in case of gas turbine engines for motor vehicles due to the lack of space frequently encountered in such cases.

In known arrangements featuring gas turbine engines with rotating regenerative heat exchangers of disc, annular or drum shape, the heat exchangers are arranged laterally of or above the engine, and thus require considerable additional space.

Furthermore, a rotating regenerative heat exchanger has become known in the German Auslegeschrift 1,221,850, the axis of rotation of which is arranged parallel to the longitudinal center axis of the propulsion unit or engine, whereby its drum encloses the gas turbine engine almost completely, A severe handicap of this arrangement is the fact that the access to engine components which are to be serviced, is impaired. The gas turbine engine with rotating regenerative heat exchanger, as disclosed in the German Auslegeschrift 1,221,850, has compact dimensions. However, these compact dimensions necessitate with this solution a multiple deflection of the air and gas streams by means of gas and air ducts, whereby occurring flow losses will simultaneously lead to performance losses of the engine.

Thus, the main objective of the present invention essentially resides in creating a rotating regenerative heat exchanger which, by its coordination to a gas turbine engine, forms a compact unit with the latter and yet enables a conduction of the media required for heat exchanging and of the engine exhaust gases, which is favorable from a streamline point of view and is connected with low performance or output losses.

As solution to the underlying problems, the present invention proposes that the axis of rotation of the heat exchanger be arranged inclined to the center longitudinal axis of the gas turbine engine or drive unit.

In a further refinement of the inventive concept, the axis of rotation of the heat exchanger is to be arranged inclined at an angle of 15° to 65° to the center longitudinal axis of the gas turbine engine.

In order to obtain a conduction or flow pattern which is particularly satisfactory from a streamline point of view and which is connected with small power losses for the engine, of the compressor air heated up by the heat exchanger to the combustion chamber as well as of the engine exhaust gases from the combustion chamber to the turbine of the engine, the present invention further proposes that the inclined axis of rotation of the exchanger be arranged parallel to the center longitudinal axis of the combustion chamber of the gas turbine engine. This arrangement contributes further to a compact engine unit.

These and other objects, features, and advantages of the present invention will become more apparent from the following description when taken in connection with the accompanying drawing which shows, for purposes of illustration only, several embodiments of the present invention, and wherein.

Figure 1:
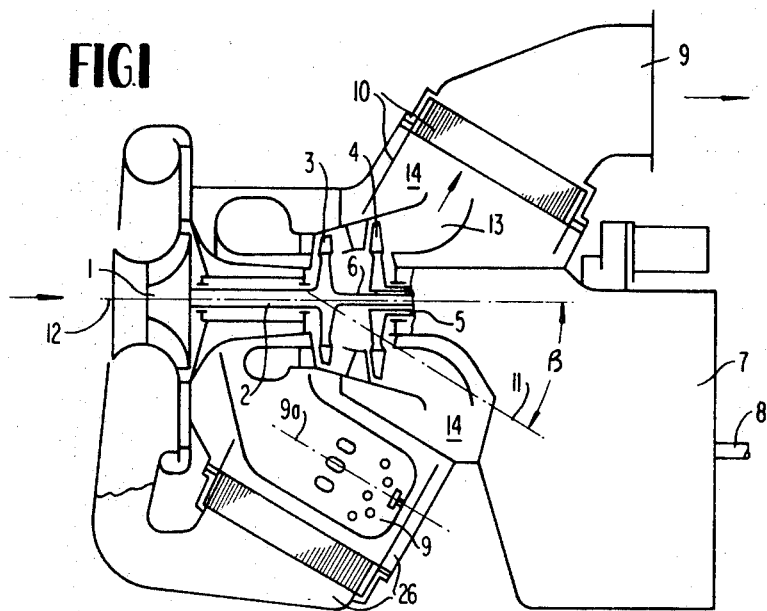
FIG. 1 is a somewhat schematic side view of a first embodiment of an arrangement according to the present invention of a heat exchanger on a gas turbine engine.

Referring now to the drawing, wherein like reference numerals are used to designate similar parts throughout the various views, and more particularly to FIG. 1, the embodiment shown in this figure is a gas turbine engine or drive unit with heat exchanger, intended especially for the drive of a motor vehicle.

Basically, the gas turbine engine or drive unit essentially consists of a compressor 1, which is connected to a turbine 3 by way of a shaft 2. The turbine 3 is followed by a power or output turbine 4 which, by means of a hollow shaft 5, encloses an extension 6 of shaft 2. The power or output turbine 4 transfers its power output to an output shaft 8 by way of transmission 7, which, in the drawing, is indicated only schematically and represented symbolically. Reference numeral 9 designates the combustion chamber of the turbine engine while reference numeral 10 is a regenerative heat exchanger, rotatable about an axis 11, which is inclined to the longitudinal center axis 12 of the gas turbine engine at an angle $\beta$. The heat exchanger 10 thereby encloses the combustion chamber 9, whose longitudinal center axis 9a is preferably arranged parallel to the inclined rotating axis 11 of the heat exchanger. By the arrangement of heat exchanger 10 and combustion chamber 9 is obtained the compact design, as aimed at in the present invention, of the gas producer with conduction paths for the heat exchanging media to be conducted to and out of the heat exchanger, which is favorable from a streamline point of view and are as short as possible.

Figure 2:
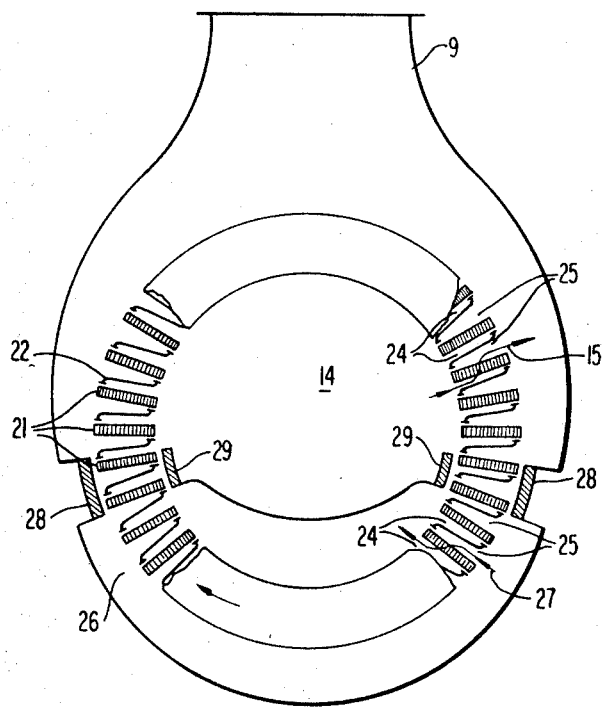
FIG. 2 is a somewhat schematic view illustrating certain details of the gas turbine engine and of the heat exchanger according to FIG. 1.
Figure 3:
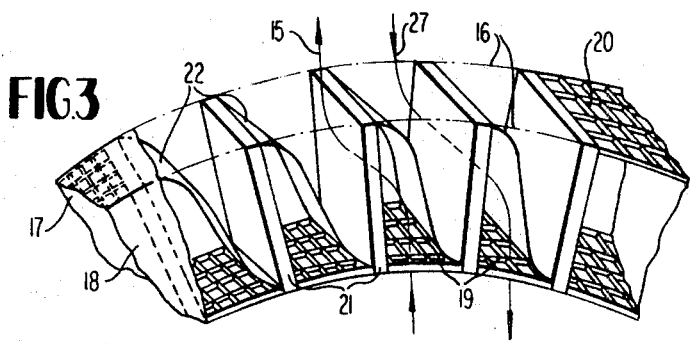
FIG. 3 is a somewhat schematic, partial perspective view of the heat exchanger drum according to FIG. 2 with some parts cut away for the sake of clarity.

During engine operation, the hot exhaust gases reach a collector housing 14 (FIG. 2) from an exhaust duct 13 and flow through the heat exchanger drum in the direction of arrow 15 (FIGS. 2 and 3). Contours 16 are the contour lines of the heat exchanger drum. In accordance with the required coordination of this heat exchanger according to FIGS. 2 and 3 to a gas turbine engine according to FIG. 1, the heat exchanger according to FIG. 3 has been constructed as radial flow heat exchanger.

For this reason, the lateral boundary walls 17, 18 of the heat exchanger drum are of closed construction, while the wall following the inner diameter of the heat exchanger drum as well as the wall following the outer diameter of the heat exchanger drum are constructed in the form of flow-permeable grids 19, 20. In addition, equally spaced and radially extending matrix elements 21 are arranged in the heat exchanger drum. Two baffle-plates 22 are coordinated to each matrix element 21 to form flow ducts 24, 25 (FIG. 2) which, together, also form a chamber, that is gas-tight in the direction of the circumference of the heat exchanger drum. Thus, the hot exhaust gases of the gas turbine engine flow through the grids 19 in the direction of arrow 15, and reach the flow ducts 25 (FIG. 2) assisted in the flow conduction by the baffles 22, flowing through matrix elements 21 coaxially to the axis of rotation 11 (FIG. 1).

Although not shown in further details in the drawings, matrix elements 21 have a porous metal or ceramic material structure which enables them to store a portion of the heat of the gas turbine engine exhaust gases (FIG. 1).

During engine operation, the heat exchanger 10 rotates about its axis 11 and the matrix elements 21, acted upon by the exhaust gas by way of the collector space 14 (FIG. 2), thereby reach the zone of the collector housing 26, supplied with compressed air from the compressor (FIG. 1). The matrix elements 21, heated up with heat portions from the exhaust gases, are then subjected to a compressor air flow by way of ducts 25 in the direction of arrow 27 (FIGS. 2 and 3), whereby the compressor air, now in the heated-up condition by reason of the heat stored in the matrix elements, reaches the combustion chamber 9 by way of flow ducts 24. As may be further seen from FIG. 2, the heat exchanger 10 passes, during its rotary motion, through sealing elements 28, 29, which tightly enclose the inner and the outer circumference of the heat exchanger drum so that, when the heat exchanger drum is passing through these sealing elements 28, 29, the collector spaces 14 and 26 are always sealed with respect to each other.

During engine operation, combustion chamber 9 (FIG. 1) thus receives combustion air that is continuously heated up by the exhaust gases.

Figure 4:
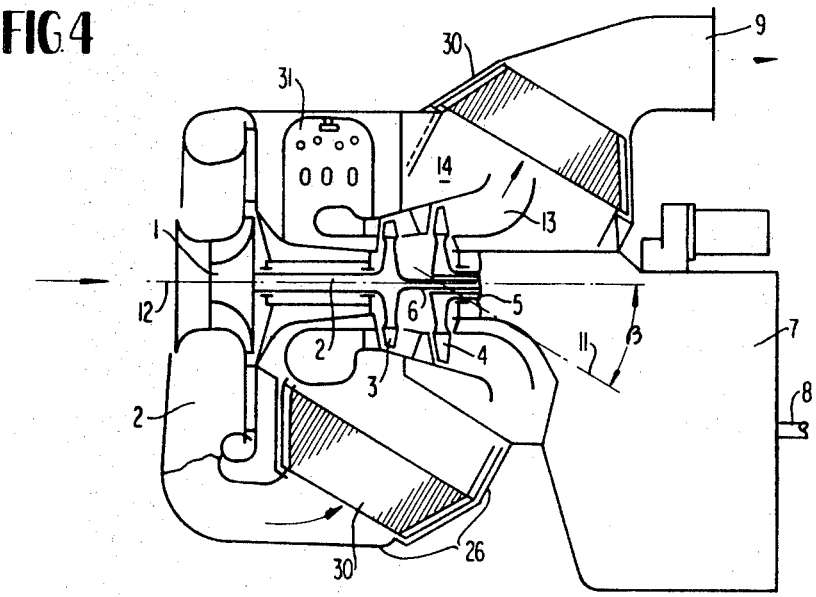
FIG. 4 is a somewhat schematic side view of a second embodiment of an arrangement according to the present invention of a heat-exchanger installed in a second gas turbine engine.

The embodiment of a gas turbine engine or drive unit with a heat exchanger as shown in FIG. 4 differs from the one according to FIG. 1 only in that its heat exchanger 30 has a drum cross section which is decreased from the inner to the outer diameter (chamfered or bevelled-off corners) and in that the combustion chamber 31 is arranged outside the heat exchanger 30. This will result further in a smaller overall diameter of the drum of the heat exchanger 30 and thus in an even more compact gas turbine engine. The operation of the gas turbine engine to FIG. 4, as well as that of its associated heat exchanger 30, is identical with that of the gas turbine engine and its associated heat exchanger 10 according to FIG. 1.

Figure 5:
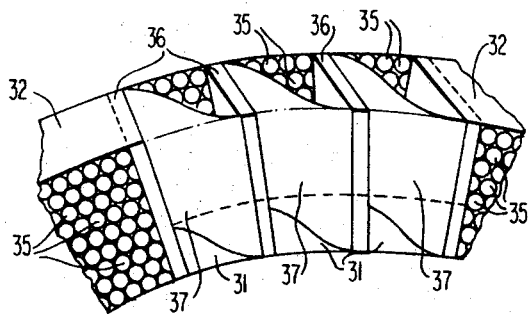
FIG. 5 is a somewhat schematic partial perspective view illustrating a heat exchanger drum in a second embodiment, with parts cut away for the sake of clarity.
Figure 6:
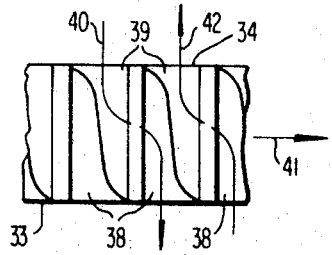
FIG. 6 is a top plan view on the inside of a heat exchanger segment according to FIG. 5.

The embodiments in FIGS. 5 and 6 show a heat exchanger drum intended for an axial in- and outflow of heat-exchanging media. The drum of this heat exchanger has a closed inner wall 31 (following the inner diameter of the drum) and a closed outer wall 32 (following the outer diameter of the drum). In order to enable, with this heat exchanger, an axial in- and outflow of a heat exchanger medium, the lateral boundary walls 33, 34, of the heat exchanger drum are provided with apertures 35. Equally spaced matrix elements 36 are arranged inside the heat exchanger drum. Two baffles 37 are associated with each matrix element 36 to form flow ducts 38, 39, which together form a chamber which is gastight in the direction of the circumference of the heat exchanger drum.

Thus, for example, the exhaust gases of a jet engine (not shown in this particular case) flow in the direction of arrow 40 through the apertures 35 in the wall 34 into flow ducts 39 of the heat exchanger drum, from where, guided through matrix elements 36 by means of baffles 37, the exhaust gases finally enter the exhaust duct of an engine (not shown in the figure) after leaving the flow ducts 38. After rotation of the heat exchanger in the direction of arrow 41 about its axis (not shown in the drawing), the matrix elements 36, heated up by the exhaust gases, reach the air intake (not shown) of an engine compressor, whereby the compressor air, using the flow ducts 38, 39, flows in the direction of arrow 42 through the matrix elements, through which the exhaust gases has previously flown in the opposite direction. On its way, the compressor air absorbs a portion of the heat stored in the matrix elements and reaches the combustion chamber of a gas turbine engine (not shown here) in an already preheated condition.

While we have shown and described several embodiments of the present invention, it is understood that the same is not limited thereto but is susceptible of numerous changes and modifications as known to a person skilled in the art, and we therefore do not wish to be limited to the details shown and described herein but intend to cover all such changes and modifications as are within the scope of those skilled in the art.

We claim:

1. A rotating regenerative heat exchanger for a gas turbine engine which includes a combustion chamber, a compressor and an air duct leading from the compressor to the heat exchanger, wherein the heat exchanger brings about by means of a portion of the heat contained in the exhaust gases of the gas turbine engine a preheating of the compressor air to be supplied to the combustion chamber, characterized in that the heat exchanger is substantially drum-shaped and encloses the turbine unit in such a manner that, at the top of the gas turbine engine, there is free access to engine components, the axis of rotation of the heat exchanger being inclined to the longitudinal center axis of the gas turbine engine, the air duct leading from the compressor to the heat exchanger having an overall deflection of between 115° and 165°, and a gas duct outlet leading from the last stage of turbine means to the heat exchanger having approximately the radial direction of the heat exchanger.